(12) United States Patent
Munoz et al.

(10) Patent No.: US 10,330,790 B2
(45) Date of Patent: Jun. 25, 2019

(54) MULTIPATH REJECTION USING COOPERATIVE GPS RECEIVERS

(71) Applicant: Linquest Corporation, Los Angeles, CA (US)

(72) Inventors: Michael Munoz, Los Angeles, CA (US); Shawkang Wu, Los Angeles, CA (US); Faezeh Mousavi, Los Angeles, CA (US)

(73) Assignee: Linquest Corporation, Los Angeles, CA (US)

( * ) Notice: Subject to any disclaimer, the term of this patent is extended or adjusted under 35 U.S.C. 154(b) by 161 days.

(21) Appl. No.: 14/710,497

(22) Filed: May 12, 2015

(65) Prior Publication Data

US 2015/0323675 A1    Nov. 12, 2015

Related U.S. Application Data

(60) Provisional application No. 61/992,175, filed on May 12, 2014.

(51) Int. Cl.
| | | |
|---|---|---|
| *G01S 19/05* | (2010.01) | |
| *G01S 19/06* | (2010.01) | |
| *G01S 19/13* | (2010.01) | |
| *G01S 19/22* | (2010.01) | |
| *G01S 19/46* | (2010.01) | |
| *G01S 19/51* | (2010.01) | |

(Continued)

(52) U.S. Cl.
CPC .......... *G01S 19/05* (2013.01); *G01S 5/0289* (2013.01); *G01S 19/06* (2013.01); *G01S 19/13* (2013.01); *G01S 19/22* (2013.01); *G01S 19/46* (2013.01); *G01S 19/51* (2013.01); *G01S 5/0036* (2013.01)

(58) Field of Classification Search
CPC .......... G01S 19/05; G01S 19/22; G01S 19/46; G01S 19/51; G01S 5/0027; G01S 19/15; G01S 19/06; G01S 5/0215; G01S 5/02; G01S 19/30; G01S 19/23; G01S 19/07; G01S 5/0009; G01C 15/002
USPC ....................................................... 242/357.43
See application file for complete search history.

(56) References Cited

U.S. PATENT DOCUMENTS 5,543,803 A * 8/1996 Serfling ................. G01S 19/22
                                                      342/357.64
5,692,008 A * 11/1997 Van Nee ................ G01S 19/22
                                                      342/357.25

(Continued)

FOREIGN PATENT DOCUMENTS

| DE | 102011001296 A1 | 4/2012 |
| WO | WO-96/06363 A1 | 2/1996 |

*Primary Examiner* — Vladimir Magloire
*Assistant Examiner* — Daniel P Malley, Sr.
(74) *Attorney, Agent, or Firm* — Mintz Levin Cohn Ferris Glovsky and Popeo, P.C.

(57) ABSTRACT

Systems and methods are disclosed for improving the speed and accuracy of terrestrial tracking with more than one receiver. Furthermore, terrestrial tracking of more than one receiver can be improved in areas where terrestrial tracking has been difficult to accomplish with acceptable accuracy, such as in rural areas where buildings can reflect satellite, and other, signals. For example, fast and precise position estimation in a short delay multipath environment can be solved by simultaneously estimating the position of multiple receivers using receiver to receiver distance ranges.

19 Claims, 13 Drawing Sheets

(51) Int. Cl.
*G01S 5/02* (2010.01)
*G01S 5/00* (2006.01)

(56) References Cited

U.S. PATENT DOCUMENTS

| | | | | |
|---|---|---|---|---|
| 6,211,817 B1* | 4/2001 | Eschenbach | ............ | G01S 19/07 342/357.31 |
| 6,369,755 B1* | 4/2002 | Nichols | ................ | G01C 15/002 342/357.52 |
| 6,542,823 B2* | 4/2003 | Garin | ..................... | G01S 5/0009 342/357.64 |
| 6,765,531 B2* | 7/2004 | Anderson | .................. | G01S 5/02 342/378 |
| 6,809,684 B2* | 10/2004 | Brenner | .................. | G01S 19/15 342/357.27 |
| 7,668,554 B2* | 2/2010 | Chang | ..................... | G01S 19/05 340/539.13 |
| 7,970,411 B2* | 6/2011 | Pande | ..................... | G01S 5/0027 342/352 |
| 8,078,189 B2* | 12/2011 | Chang | ..................... | G01S 19/05 342/357.2 |
| 8,116,976 B2* | 2/2012 | Garin | ..................... | G01S 19/06 342/357.21 |
| 8,165,807 B2* | 4/2012 | Garin | ..................... | G01S 19/22 342/357.61 |
| 2002/0116124 A1* | 8/2002 | Garin | .................. | G01S 5/0009 701/483 |
| 2004/0004570 A1* | 1/2004 | Townsend | ............. | G01S 5/0045 342/384 |
| 2007/0118285 A1* | 5/2007 | Baryshnikov | ......... | G01S 5/0289 701/469 |
| 2008/0150796 A1* | 6/2008 | Syrjarinne | ............. | G01S 19/05 342/357.63 |
| 2009/0121932 A1* | 5/2009 | Whitehead | ........... | A01B 69/008 342/357.36 |
| 2009/0191894 A1* | 7/2009 | Poegel | .................. | G01S 5/0215 455/456.1 |
| 2010/0135365 A1* | 6/2010 | Chen | ....................... | G01S 19/22 375/148 |
| 2010/0164789 A1* | 7/2010 | Basnayake | ............ | G01S 5/0072 342/357.23 |
| 2012/0015670 A1* | 1/2012 | Boyer | ..................... | G01S 19/46 455/456.1 |
| 2012/0281735 A1* | 11/2012 | Martin | .................... | G01S 19/30 375/150 |
| 2013/0342396 A1* | 12/2013 | O'Connor | ............... | G01S 19/28 342/357.42 |
| 2014/0218240 A1* | 8/2014 | Kpodzo | ................ | G01S 5/0215 342/450 |

* cited by examiner

MULTIPATH REJECTION USING COOPERATIVE GPS RECEIVERS

CROSS-REFERENCE TO RELATED APPLICATIONS

This applications claims priority to and the benefit of U.S. Provisional Patent Application No. 61/992,175, filed May 12, 2014, which is incorporated herein by reference in its entirety.

TECHNICAL FIELD

The disclosed subject matter relates to improving the positioning of a receiver (e.g. a receiver of a position determination or navigation device or system) of signals that uses those signals to estimate position based on information received from other receivers.

BACKGROUND

One method of determining location is through the use of satellite-based position determination systems. Satellite-based position determination systems include the U.S Global Positioning System (GPS) as well as comparable systems, such as the Russian (GLONASS), the European Galileo network, the Chinese Compass network, and the like. Such systems generally include a constellation of satellites transmitting signals that include the time the message was transmitted and, satellite position at the time of message transmission. For purposes of this disclosure, satellite navigation systems are generically referred to by the acronym GPS.

A GPS receiver calculates information about its position by precisely timing its receipt of messages from one or more of the constellation of satellites. The receiver uses the messages to determine the transit time of each message and computes the distance to each satellite using the speed of light. For example, at least four satellites can be used to determine the position of a receiver. Each satellite transmits a signal that can be used to estimate the propagation time from each satellite to the receiver. The distance between the satellite and the receiver can in turn be estimated from the propagation time. The distance from the satellite to receiver can be described in terms of the receiver position by a Euclidean distance equation. If there are four satellites, then there are four distance equations. The position of the receiver is (x,y,z,t) where t is the time offset error between the satellites and the receiver. This approach yields four equations and four unknowns Because signals from multiple satellites are necessary for the receiver to accurately determine a position, the signal sent by each satellite in the constellation generally includes a unique coding. For example, in the U.S. Global Positioning System, a different pseudorandom noise (PRN) code is used by each satellite so that the receiver can identify the satellite from which a signal originated. The receiver identifies the satellite by cross-correlating known PRN codes with an incoming signal. Once a satellite's signal has been identified in the overlapping signals received by the receiver, the time shift of the signal is used to determine the distance between the satellite and receiver, the direct path range estimate.

The direct path range estimate between a satellite and receiver may be degraded by interference signals, which includes multipath interferers and coherent jammers. The direct path range estimate between a satellite and receiver may be degraded by incoherent signals, such as intention jamming and other signals. The type of error resulting from multipath falls into two categories, long delay and short delay. The long delay has the multipath and direct signal time delay difference being greater than the pseudo random noise (PRN) sequence chip time; the short delay is less than the chip time. The reflected signal is a copy of the direct signal that merely took a longer path to get to the receiver.

The reflected signal interfering with the direct GPS signal may cause poor tracking accuracy. GPS tracking accuracy can be particularly poor in such areas as urban environments where buildings can reflect and delay GPS signals. In some cases, reflections from buildings and other structures in some urban areas can cause GPS position accuracy to be sufficiently poor that drivers using GPS navigation can be directed off route or in circles.

SUMMARY

In one aspect systems, methods, and computer program products configured to facilitate the determination of the location of a reference-receiver relative to one or more unknown-location receivers is described. The systems, methods, and computer program products may include receiving, at the reference-receiver, receiver-distance information from one or more unknown-location receivers. The receiver-distance information can include an indication of the distance between the reference-receiver and the one or more unknown-location receivers.

Beacon-distance information can be received at a reference-receiver. The beacon-distance information can be provided by the one or more unknown-location receivers and transmitted, or broadcast, to the reference-receiver. The beacon-distance information can include an indication of the distance between one or more beacons and the one or more unknown-location-receivers.

The locations of the one or more unknown-location receivers can be determined relative to the reference-receiver based on the received receiver-distance information from the one or more unknown-location receivers, and the received beacon-distance information from the one or more unknown-location receivers.

One or more beacon signals can be received at the reference-receive from one or more beacons. The beacons may be satellites, such as terrestrial location satellites, or may be on-Earth infrastructure. The receivers may be configured to receiver terrestrial locations signals. One such system includes GPS signals. GPS is used herein to describe any satellite-based positioning system. The one or more beacon signals received at the reference-receiver can be used to filter any likely location determinations of the reference-receiver provided by the beacon signals.

A local-coordinate system can be computed for the reference-receiver and the one or more unknown-location-receivers centered on the reference-receiver. A sphere can be defined having a surface area on which individual ones of the one or more unknown-location receivers are positioned. The radius of the sphere can be based on the receiver-distance information received by the reference-receiver from individual ones of the one or more unknown-location receivers. The center of the sphere can based on the local-coordinate system. A plane can be determined on which the reference-receiver and at least some of the one or more unknown-location receivers reside to provide the radius of a circle on which the one or more unknown-location receivers are positioned relative to the reference-receiver. When there are more than three receivers, the receivers, including the reference-receiver can be grouped into different groups of three receivers to determine multiple planes on which the receivers reside. A range of beacon-to-unknown-location-receiver distances can be determined based on the beacon-distance information received from the unknown-location receivers and constrained by the circle.

One or more correlation coefficients can be computed at the unknown-location-receivers using a correlation function and based on the ranges of beacon-to-unknown-location-receiver distances for the one or more unknown-location receivers. The unknown-location-receivers can transmit and/or broadcast this information. The reference-receiver can receive the one or more correlation coefficients from the one or more unknown-location-receivers.

The reference-receiver can filter the one or more correlation coefficients based on constraints provided by the determined radii of the circles on which the one or more unknown-location-receivers are located to provide filtered correlation coefficients. The reference-receive can compute the likely locations of the one or more unknown-location-receivers relative to the reference-receiver based on the filtered correlation coefficients. Computing the likely location of the one or more unknown-location receivers relative to the reference-receiver can include applying each of the filtered correlation coefficients to a location algorithm to converge to a solution.

The receiver-distance information can be based on one or more wireless communications between the reference-receiver and the one or more unknown-location receivers. The one or more wireless communications can include one or more of WiFi, BLUETOOTH, Near-Field-Communication, GSM, GPRS, dictated short-range communication, and/or other wireless communications.

In some variations, the received beacon-distance information from the one or more unknown-location receivers can comprise one or more correlation coefficients for individual ones of the one or more beacons based on the one or more signals received at the unknown-location-receivers from the one or more beacons. Each beacon can emit a signal containing a code specific to that beacon.

In some variations, geographic location information may be received at one of the reference-receiver or the one or more unknown-location-receivers. This geographic information may provide an indication of the location of one of the reference-receiver or the one or more unknown-location-receivers. The geographic location of the reference-receiver and/or the one or more unknown-location-receivers can be determined based on the received geographic location information and the relative location of the reference-receiver to the one or more unknown-location receivers.

The presently described subject matter provided one or more technical advantages. For example, the presently described subject matter provides for increased accuracy in the determination of the location of receivers relative to other receivers. The presently described subject matter specifically provides for increased accuracy in the determination of receivers relative to other receivers in high-noise environments. Consequently, if the geographic location of just one of the receivers in a network or array of receivers is known, the geographic location of all of the receivers in a network or array of receivers can be determined to a much greater accuracy.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the presently described software architecture, it should be readily understood that such features are not intended to be limiting. The claims that follow this disclosure are intended to define the scope of the protected subject matter.

BRIEF DESCRIPTION OF THE DRAWINGS

These and other aspects will now be described in detail with reference to the following drawings.

While many specific examples are included, it will be understood that such specifics are intended to be explanatory of the possible scope of one or more implementations of the current subject matter and should not be construed as limiting on the scope of claims in applications claiming priority to this application.

Like reference symbols in the various drawings indicate like elements.

DETAILED DESCRIPTION

The presently disclosed subject matter involves the processing of one or more algorithms. The one or more algorithms can be implemented by at least one programmable processor forming at least one computing device. The at least one programmable processor may be associated with a receiver. The receiver may be configured to receive signals from beacons. The signals may include an identity of the beacon and a time at which the signal was emitted by the beacon. The signals may include an indication of a geographic location of the beacon. Such indications may include a coordinate of the beacon. A beacon may belong to a terrestrial navigation system. Such beacons may be located on the surface of the Earth or may be satellites orbiting the Earth.

The at least one programmable processor may be associated with one or more wireless communication technologies that are configured to communicate with other receivers. The processors can be configured to implement the algorithm(s) through hardware, software, firmware or other implementation methods.

In the case of GPS systems, such systems rely on signals from satellites to be received by GPS receivers. Those signals facilitate the determination of a location of the receiver on the surface of a sphere centered on the satellite. Correlating multiple signals to determine the receiver's location on the surface of multiple spheres facilitates positioning of the receiver. However, when signals from the same satellite, having a particular encoding, and being emitted at the same time, are reflected by objects around the receiver, the determination of the receiver's location degrades.

The present disclosure is not limited to satellite signals. Positioning beacons may be located on the surface of the Earth. Such beacons may emit signals identifying themselves and a time at which the signals were emitted by the beacon. The signals may include location information such as a coordinate on a coordinate system of the location of the beacon. While specific implementations may be described herein with respect to satellites and/or GPS satellites, one of ordinary skill in the art would understand and appreciate that the present subject matter relates to any type of location-based system that emits signals identifying the origin and time of emission of those signals, terrestrial or otherwise.

Figure 1:
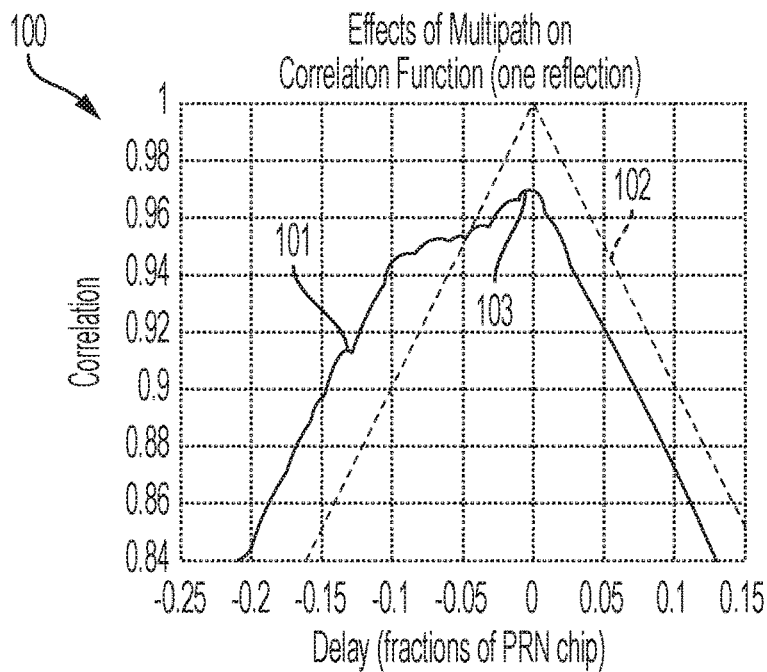
FIG. 1 is an illustration of a graph showing the effects of multipath on the correlation function caused by one reflection.
Figure 2:
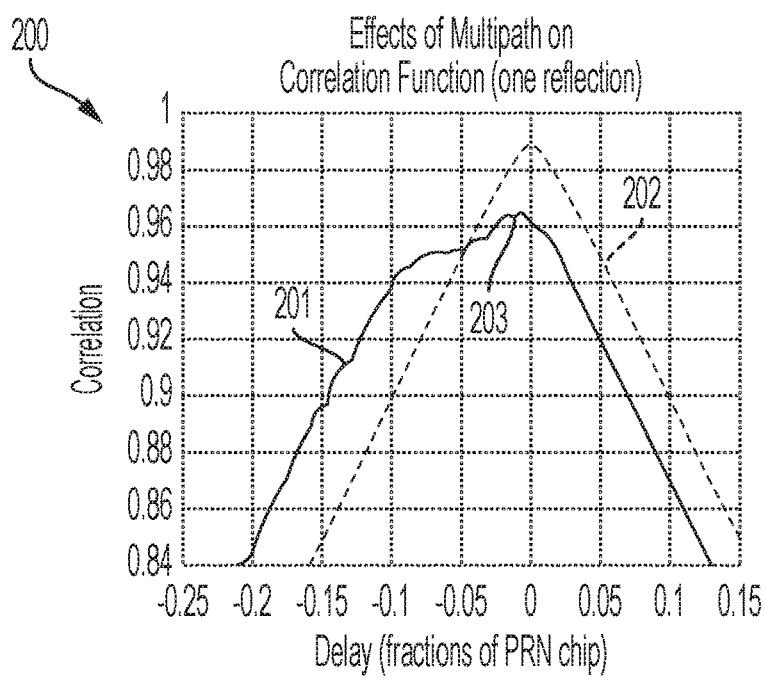
FIG. 2 is an illustration of a graph showing the effects of multipath on the correlation function caused by one reflection, as in FIG. 1, with receiver/channel filtering added.

The direct signal, having a time stamp reflecting the time it was emitted from a beacon, may arrive at the receiver with a delay $T_D$ from the time it was emitted. The reflected signal may arrive at the receiver with a delay $T_R$. The direct signal and the reflected signal may interfere or cross-correlate. The cross-correlation of the direct signal and the reflected signal may make peak detection and tracking more difficult because the cross-correlation will result in a maximum peak shift. Other elements within the receiver, such as the transmitter and/or receiver will add additional noise to the cross-correlated signal. FIGS. 1 and 2 are illustrations of graphs 100 and 200, respectively, showing the effects of the multipath on the correlation function, with one reflection. Many signals from many beacons may be received at a receiver. Each of the signals may include a unique code associated with the emitting beacon. GPS satellites, for example, emit PRN codes. The PRN code is specific to individual satellites. The code associated with a specific beacon in the group, or constellation, of beacons is isolated by calculating a cross-correlation function between a known signal generated by the receiver, and an aggregate of signals received by the receiver. For example, a cross-correlation function between a known PRN signal generated by the receiver, and an aggregate of signals received by the receiver, can be calculated. The cross-correlation function identifies parts of the received signal attributable to the beacon matching the unique calculated code and by returning correlation coefficients as a function of beacon code delay, or lag. The beacon code delay results from travel time of the signal from the beacon to the receiver, with reflected paths resulting in greater delay than a direct path. The graph 100 shows the parts of a detected cross-correlation function (e.g. the "combination") resulting from direct path and reflected path signals from a satellite to the receiver. As shown, the effect of the reflected path, which has a delay relative to the direct path, is to cause a flattening of the peak of the combination correlation curve. This peak flattening result in uncertainty in the actual direct path delay, which is reflected in uncertainty in the calculated distance from the satellite to the receiver and therefore in the actual position of the receiver. Further uncertainty can be added by noise, such as for example ionospheric interference with the signal from the satellite. The resulting position calculation can potentially be in error by as much as several meters.

Line 101 is the correlation of a GPS signal comprised of both the direct path and the reflected path correlated against the local reference PRN signal. Line 201 is the correlation of the GPS signal comprised of both the direct path and the reflected path correlated against the local reference PRN signal with receiver/channel filtering added. The correlation peak 203 is shifted to the left compared to correlation peak 103. Lines 102 and 202 show the unfiltered correlation function without reflections and noise. As shown in the charts in FIGS. 1 and 2, the computed location of the GPS receiver can include significant error, and that is with only one reflection. In real-world situations there may be a plurality of reflected signals cross-correlated with the direct signal. In such situations the correlation of the GPS signal and the multiple reflected signals may include multiple peaks. In some circumstances the reflected signals may be stronger than the direct signal which may cause the receiver to treat the reflected signal as the direct signal, causing further error in the accuracy of the positioning of the receiver.

This disclosure describes methods and devices related to improving position accuracy in the presence of multipath and atmospheric errors. For example, simultaneously solving for the position of a number of receivers and the relative position of those receivers can allow determination of more precise positioning of the receivers (e.g., within centimeters) relative to each other. The effects of maximum peak shift caused by the reflected signals, or the possibility of choosing the wrong maximum peak, may be mitigated. In other words, geometry of the cooperative receivers can be used as a constraint on beacon-to-receiver range estimate such that the receiver may reject correlation values that do not solve the constrained position estimation problem and a more accurate position solution can be obtained.

Approaches described herein can be advantageously applied in multiple applications, including vehicle navigation, tracking of military vehicles and personnel with improved accuracy, etc. For example, GPS tracking can be improved through city streets and alleyways. In addition, jamming signals from non-direct path angles can be rejected and indoor navigation can be assisted using non-satellite signals.

The method disclosed herein does not require a fixed known location receiver to transmit differential correction data. In addition, the probability of errors from reflections or intentional interferers can be reduced by performing geometrically constrained searches on the receiver position space. A geometrically constrained search can be visualized as a highly directional beam former that rejects any energy not on the set of a possible direct path between the satellites and receivers. The set of possible direct paths can be defined by the geometry of the receiver-to-receiver measured range data, e.g. the range data between three receivers forms the base of an irregular tetrahedron.

For example, if the ranges between a set of receivers is known, then the direct path delays can be mathematically related. This mathematical relationship can be used to minimize the position errors associated with the reflected signals. The probability that the reflected signal delays have that same relationship as the direct path delays can be directly related to the probability of a position estimation error from multipath. The probability of errors from reflections or intentional interferers can be reduced by performing a geometrically constrained search, which can be done simultaneously on the receiver position space.

Approaches consistent with the current disclosure herein can improve the computation speed and precision (e.g., within centimeters) of positions between independent devices (i.e., receivers) without the need for a fixed known location base station. For example, this can be solved by determining a relative position of a first receiver compared to other receivers. This can be done by correlating signals from beacons, for example GPS signals from GPS satellites, received at all of the receivers. Correlating the multiple signals at the multiple receivers can facilitate accurate determination of the location of the receiver compared to other receivers. In addition, the position accuracy in an urban environment (i.e., greater signal reflections) can be improved. For example, fast and precise position estimation in a short delay multipath environment can be solved by simultaneously estimating the position of multiple receivers using receiver to receiver ranges between the multiple (e.g. two or more) receivers as a set of constraints to eliminate position estimate that are wrong as a result of multipath from being considered as possible solutions.

Implementations of the current subject matter include approaches for improving the accuracy of GPS tracking with more than one receiver. Furthermore, GPS tracking of one or more receivers can be improved in areas where GPS tracking has been difficult to accomplish with acceptable accuracy, such as in urban areas where buildings can reflect GPS signals. Reflected GPS signals can result in GPS readings that are incorrect. For example, a person using GPS in an urban area can have trouble using GPS navigation due to difficulties with tracking the person's locations, such as due to GPS signals transmitted between a GPS satellite and the person being reflected from surrounding buildings. The present disclosure provides a method for improving GPS range estimation in a reflective environment and improving position accuracy, such as by using multiple receivers, as will be described in greater detail below.

As previously mentioned, one of ordinary skill in the art would understand and appreciate that the presently disclosed subject matter is applicable to any territorial location system and the reference to GPS signals in specific implementations is for example only.

Some implementations of the current subject matter can include a constrained search of satellite to receiver range space. In addition, constraints can be derived from receiver to receiver ranges and multiple independent receivers can be used to address multipath errors (e.g., signals that have been reflected off of surrounding terrain, such as buildings, canyon walls, hard grounds, etc.). As noted above, a number of independent receivers can form an ad hoc antenna array. The antenna array can be used to reject GPS signal interference, such as for example interference resulting from receipt by a GPS receiver of indirect satellite signals (e.g. reflected or "multipath") in addition to direct (e.g. unreflected or "single path") satellite signals. The present disclosure provides at least one algorithm that can reject at least some effects of reflections and related multipath errors when estimating relative position of an object (e.g., a car, a person holding a GPS receiver, etc.).

Figure 3:
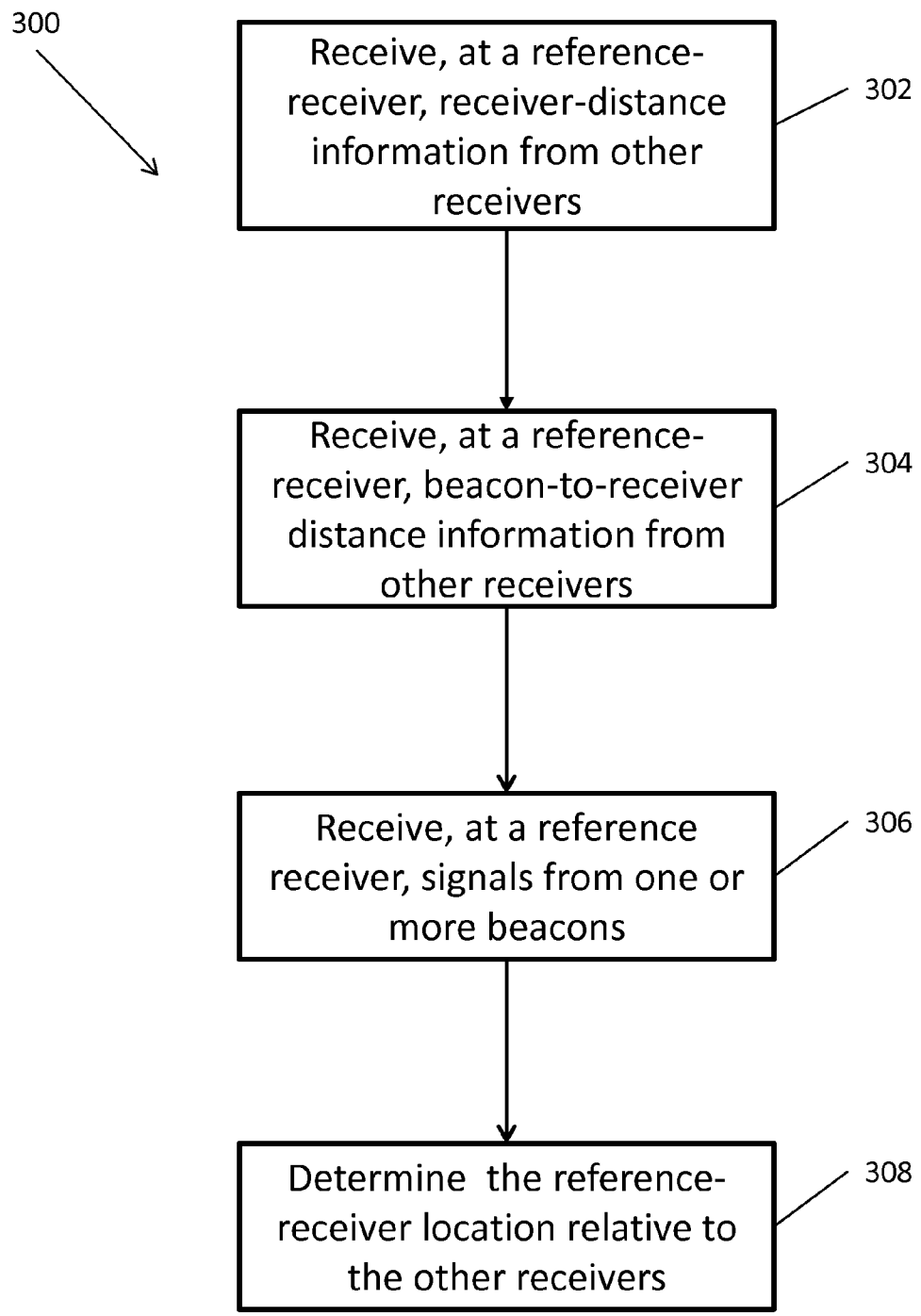
FIG. 3 shows a process for determining the location of a receiver relative to other receivers, the process having one or more features consistent with the presently described subject matter.
Figure 4:
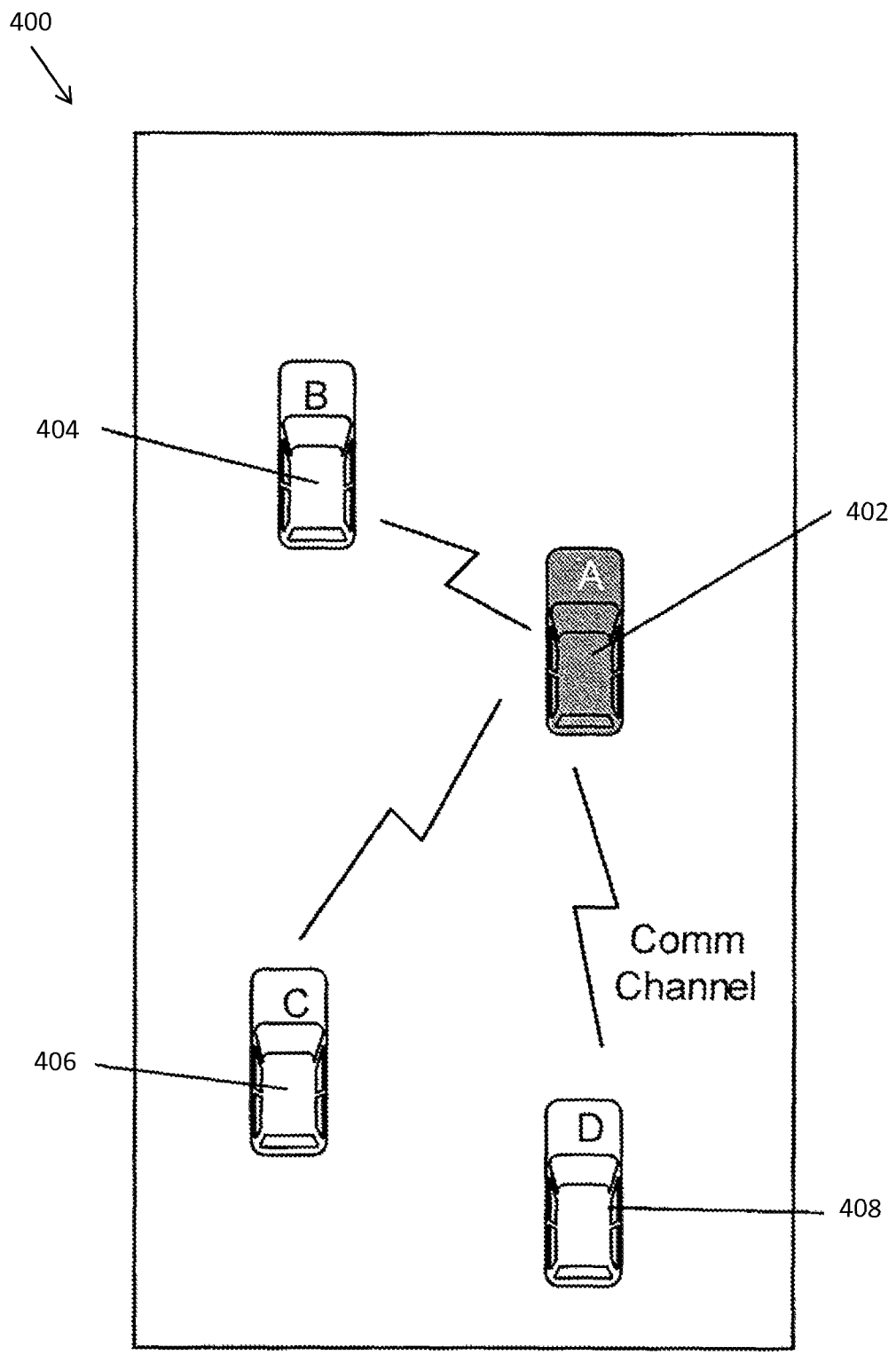
FIG. 4 shows a diagram illustrating an example ad hoc antenna array, which includes a first vehicle forming an ad hoc antenna array with a second vehicle, a third vehicle and a fourth vehicle.

FIG. 3 illustrates a process 300 for determining the relative location of a receiver compared to other receivers. The operations illustrates with reference to FIG. 3 may be performed by one or more processors that form a computing device. In some implementations, the one or more processors may be included in the receiver for receiving signals from a beacon, e.g. a GPS satellite. An example, of the multiple receivers is illustrated in FIG. 4. FIG. 4 illustrates a diagram of an example ad hoc antenna array 400, which includes a first vehicle 402 forming an ad hoc antenna array with a second vehicle 404, a third vehicle 406 and a fourth vehicle 408. Each vehicle 402, 404, 406 and 408 can be equipped with a receiver and an inter-vehicle communication link. The vehicles 402, 404, 406 and 408 can determine at least relative positioning between each other using their receivers and inter-vehicle communication links. At an operation 302, receiver-distance information from one or more unknown-location receivers, such as receivers at vehicles 404, 406, and 408, may be received at a reference-receiver, such as a receiver at vehicle 402. The relative positioning of the second, third and fourth vehicle 404, 406 and 408, respectively, relative to the first vehicle 402 can assist in determining more accurate tracking of the first vehicle 402. Any location-system equipped device (e.g., smart phone, tablet, laptop, etc.) with a wireless communication link (e.g., BLUETOOTH, Wi-Fi, dedicated short-range communications (DSRC), etc.) can be used as part of the ad hoc antenna array. At 304, beacon-distance information from the one or more unknown-location-receivers can be received at the reference-receiver. The receiver-distance information may include an indication of the distance between the one or more beacons and the one or more unknown-location-receivers.

Figure 5:
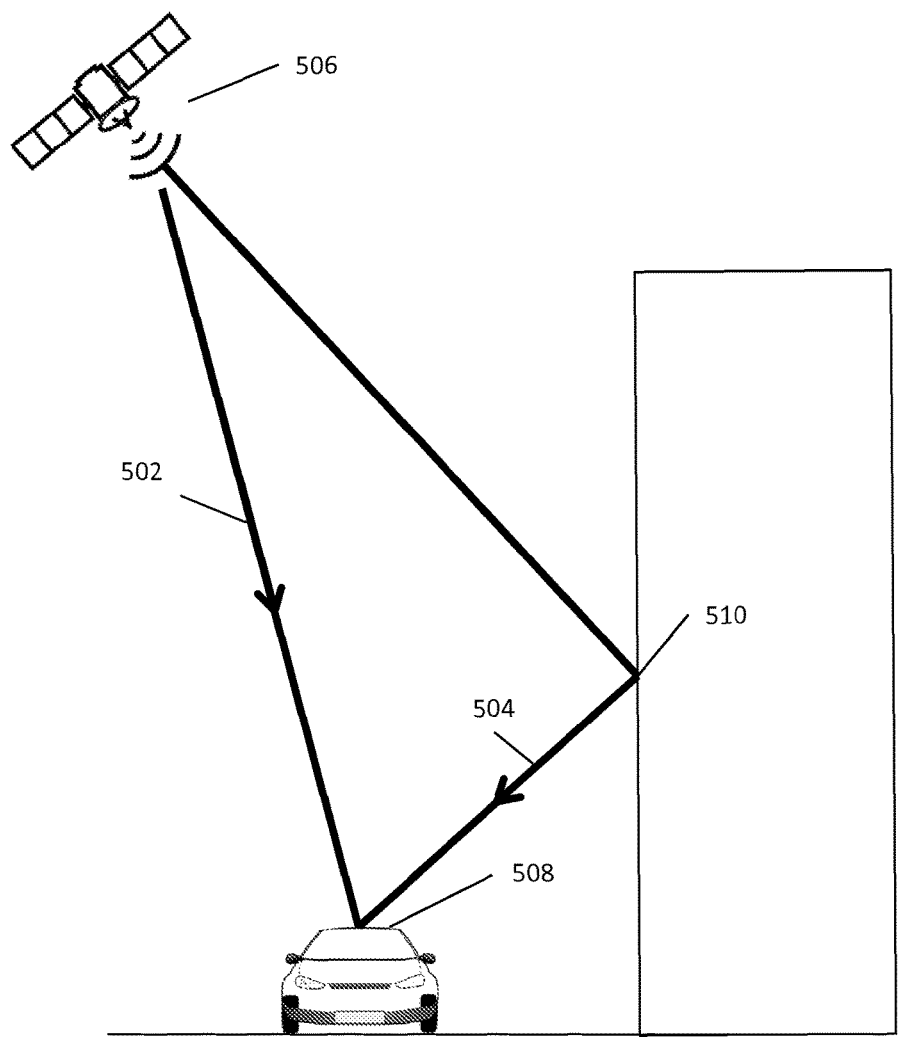
FIG. 5 shows a diagram illustrating a direct GPS signal pathway and a reflected GPS signal pathway.

FIG. 5 shows a diagram illustrating an example of a direct GPS signal pathway 502 and a reflected GPS signal pathway 504. The direct GPS signal pathway 502 can extend directly from a satellite 506 to a receiver 508. The reflected GPS signal pathway 504 can extend from the satellite 506 to a reflective surface 510, and then to the receiver 508. Because the reflected GPS signal pathway 504 traverses a longer distance between the satellite 506 and the receiver 508, the reflected signal is received later than the direct pathway signal. It can be assumed that the reflected GPS pathway delay is a short delay, for the example the short delay can be assumed to be less than a GPS PRN chip duration.

Figure 6:
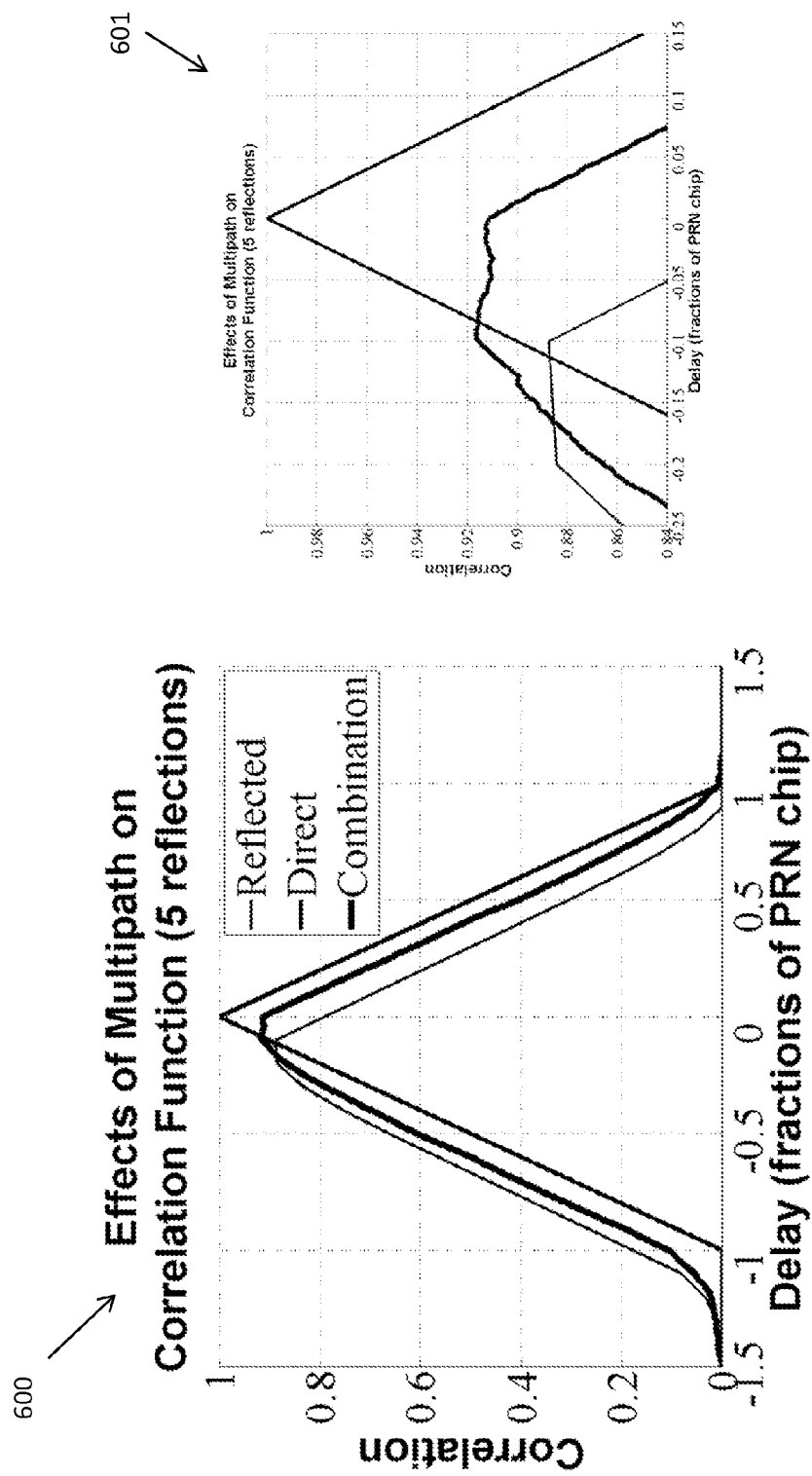
FIG. 6 shows a graph illustrating the multipath effects on a correlation function.

FIG. 6 shows graph 600 illustrating multipath effects of multipath observed cross-correlation functions, where there are five reflections. Graph 601 is an enlarged portion of the peaks of graph 600. As shown, position determination errors of more than 30 meters are possible. The delay of a significant part of the signal due to reflections can cause the combined signal to have a very flat, plateau-like peak, which significantly hampers the ability of the receiver to identify a specific, accurate delay of the PRN code resulting from direct path signals.

Figure 7:
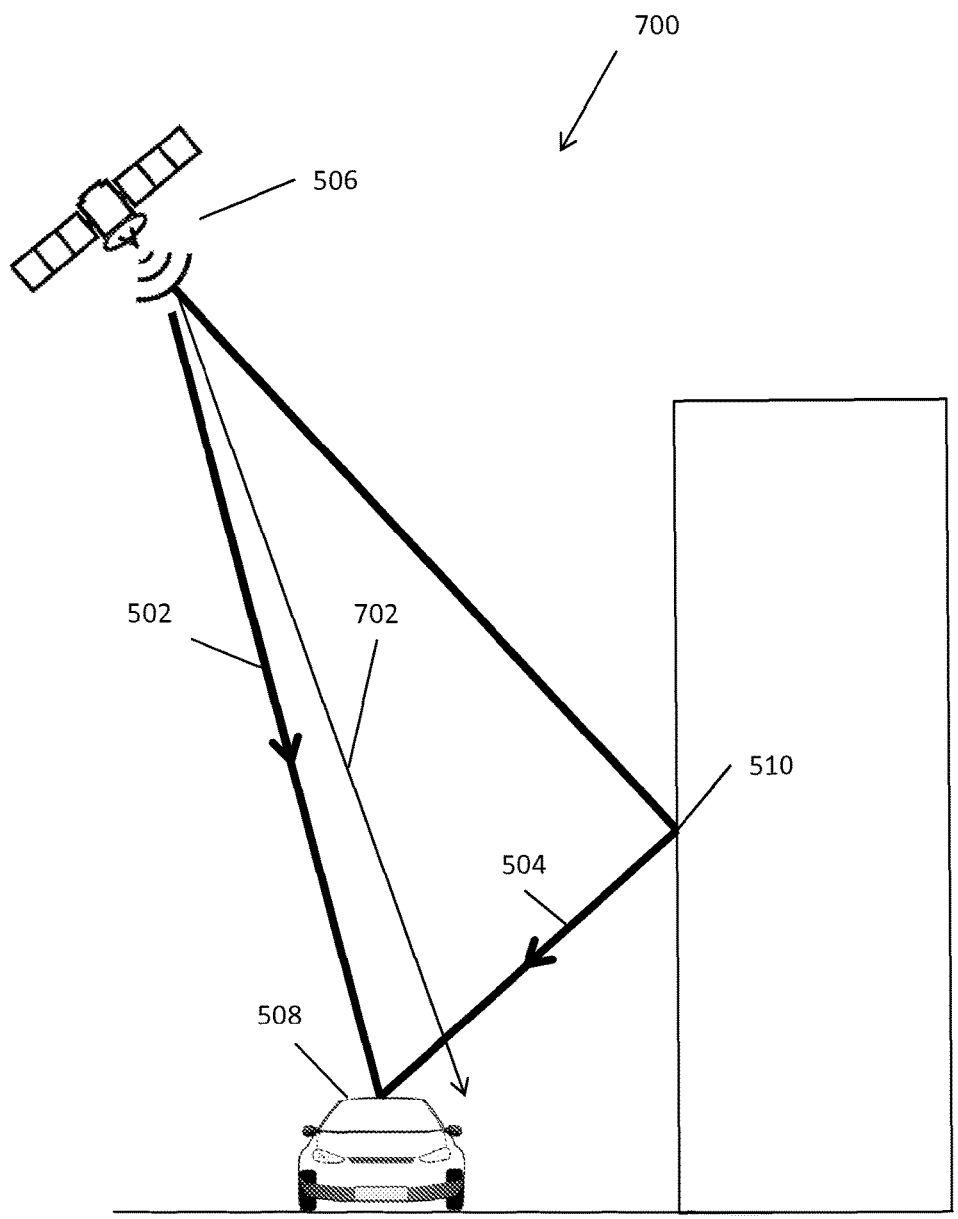
FIG. 7 shows a the resultant position determination caused by the scenario illustrated in FIG. 5.

FIG. 7 shows a diagram 700 illustrating the effects of reflections on the "combined" signal and the resulting position estimation. The line 702, which has been added to the diagram 500 of FIG. 5, represents the receiver's best estimate for a direct path signal from the satellite to the receiver, but this estimate is in error because of the uncertainty added to the cross-correlation function as a result of delays added by reflected signals from the satellite that are also received by the receiver. At 306, shown in FIG. 3, one or more signals from the one or more beacons, e.g. GPS satellites, can be received at the reference-receiver. Such signals can be received at the other receivers.

The presently described position estimation algorithm may use the approximate location of one of the receivers to create a local coordinate system. Such a receiver may include the first vehicle 402 in FIG. 4. The receiver-to-receiver range data defines the possible receiver locations on that coordinate system. The search area for each receiver is the surface area of a sphere whose radius is the unknown-receiver to reference-receiver distance.

Figure 8:
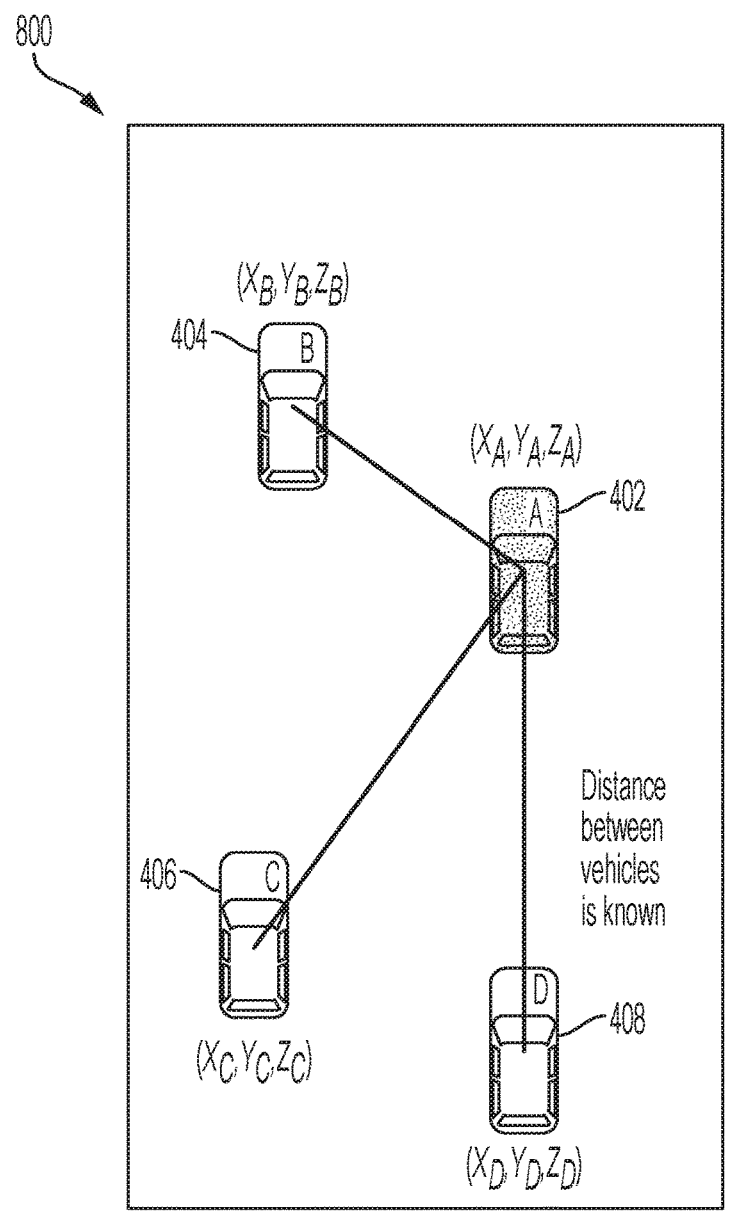
FIG. 8 shows a multi-receiver arrangement as in FIG. 3, showing the local coordinate system.

FIG. 8 shows the multi-receiver arrangement first discussed above in relation to FIG. 4, with the first vehicle 402 forming an ad hoc antenna array with the second vehicle 404, third vehicle 406 and fourth vehicle 408. Absolute positions of each of the vehicles 402, 404, 406 and 408 are shown as coordinates (e.g., longitude, latitude, altitude). The approximate location of the reference-receiver, i.e. vehicle 402, may be determined. The approximate relative positioning between each vehicle 402, 404, 406 and 408 can be determined using one or more conventional approaches, such as for example a received signal strength indication measurement, initial GPS measurements for each of the multiple receivers, or the like. Other approximate location systems may include signals from one or more other beacon-types. Such other beacon types may include signals emitted by devices at road signs, toll booths, bridges, land-based antennas and/or other infrastructure devices. The coarse (e.g. uncorrected) absolute position of the first vehicle 402 can be temporarily used as a "known" position of the first vehicle 402 and can be used to define a reference plane within which all of the receivers can be assumed to lie for computational convenience. The reference plane can be defined as a plane normal to a line passing through the center of the earth and the satellite and crossing that line at the position of the first vehicle 402. The position accuracy of the first vehicle 402 can define the size of a solution space manifold, which is bounded by the intersection of spheres centered on each of the receivers 404, 406, and 408.

Figure 9:
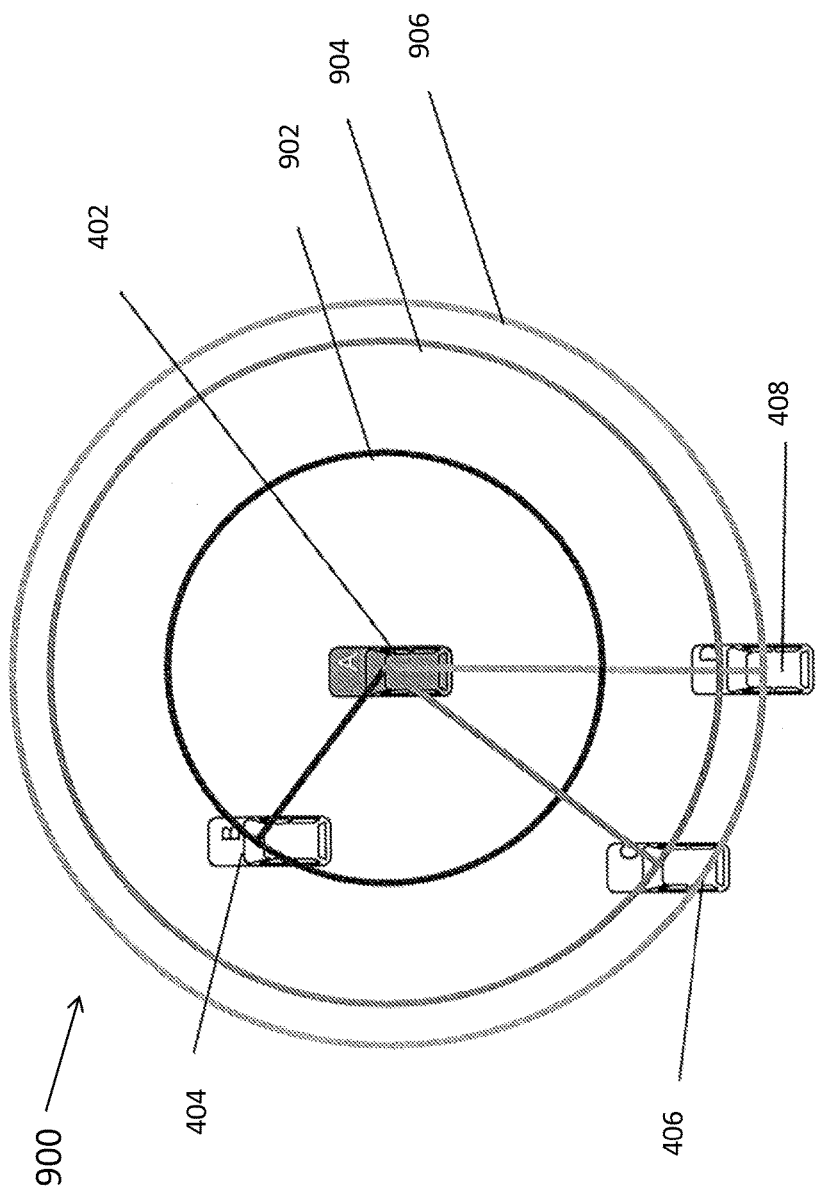
FIG. 9 illustrates an example diagram of a visual example of the receiver location constraint on a plane.

FIG. 9 illustrates an example diagram 900 of a visual example of the receiver location constraint on a plane. The diagram 900 shows the distance for each receiver (vehicle) from the reference receiver and the search region. As discussed above, each unknown-receiver is a known distance away from the reference-receiver. Consequently, the search area for each receiver is the surface area of a sphere whose radius is the unknown-receiver to reference-receiver distance. When the unknown-receiver is a vehicle within a certain threshold distance of the reference-receiver, it is reasonable to assume that the unknown-receiver and the reference-receiver are on the same plane. The diagram 900 shows the relative positioning between the second, third and fourth vehicles 404, 406 and 408, respectively, relative to the first vehicle 402. For example, the distances between the second vehicle 404 and the first vehicle 402, the third vehicle 406 and the first vehicle 402, and the fourth vehicle 408 and the first vehicle 402 can be assumed to be temporarily known, and such distances can define respective radii 902, 904, 906 of possible positions where the second vehicle 404, the third vehicle 406, and the fourth vehicle 408 can be located relative to the first vehicle 402.

At 308, as shown in FIG. 3, the location of the reference-receiver relative to the one or more unknown-location-receivers can be determined by the reference-receiver. The relative location can be based on the received receiver-distance information from the one or more unknown-location-receivers and the received satellite-distance information the one or more unknown-location-receivers. One example of determining the relative location involves using the potential position of each receiver to define the set of delays expected given the satellite locations. The signals received at each of the receiver locations are delayed by the expected amount. The correlation against the local reference signal can be computed. For a typical GPS receiver, a correlated interferer will appear as a peak in the correlation function so the computed correlation value is compared against the previous maximum value. When all possible receiver positions are tested, the maximum correlation value is used to choose the "correct" set of satellite to receiver ranges.

In some variations, the following search algorithm can be used to find the positions for the unknown-receivers $(x_1, y_1, z_1)$, and $(x_2, y_2, z_2)$ that result in the maximum value for the metric A, as described in more detail below:

1) Loop over all possible receiver positions for the unknown-receivers $(x_1, y_1, z_1)$, and $(x_2, y_2, z_2)$ subject to equations 2a, 2b, and 2c (provided below).
2) Use current trial value for the unknown-receiver positions in equations 3a, 3b, 3c, 4a, 4b, 4c (provided below) to compute the satellite to receiver distances $R_{sik}$, where i is the satellite index and k is the receiver index.
3) Using the current trial distances $R_{sik}$ along with the known satellites (i={ 1, 2, 3}) to reference receiver (k=0) distances $(R_{si0})$, from equations 1a, 1b, 1c, (provided below) compute the cross correlations.
4) Compute a metric A that is the sum of the absolute value of the cross correlation values
5) After searching over all the positions for the unknown-receivers $(x_1, y_1, z_1)$, and $(x_2, y_2, z_2)$, choose the position that coincides with the maximum value for the metric $\Lambda$.

The equations referred to above are based on the known locations of any three GPS satellites that are in orbit above the receivers. The locations of the GPS satellites are relative to an Earth Centered Earth Fixed (ECEF) coordinate system. The equations are also based on the locations of the three receivers. One reference has a location of $(x_0, y_0, z_0)$, which is known, it is the reference-receiver. Two of the receivers are at unknown locations $(x_1, y_1, z_1)$ and $(x_2, y_2, z_2)$. The distance, $R_{s10}$, $R_{s20}$, and $R_{s30}$, from the satellites to the reference receiver is computed as:

$$(x_{s1}-x_0)^2+(y_{s1}-y_0)^2+(z_{s1}-z_0)^2=R_{s10}^2 \quad \text{eq 1a}$$

$$(x_{s2}-x_0)^2+(y_{s2}-y_0)^2+(z_{s2}-z_o)^2=R_{s20}^2 \quad \text{eq 1b}$$

$$(x_{s3}-x_0)^2+(y_{s3}-y_0)^2+(z_{s3}-z_o)^2=R_{s30}^2 \quad \text{eq 1c}$$

The receiver-to-receiver distances, $r_{10}$, $r_{20}$, and $r_{12}$, can be measured independently and are related to the receiver positions using the range equations, as follows:

$$(x_1-x_0)^2+(y_1-y_0)^2+(z_1-z_o)^2=r_{10}^2 \quad \text{eq 2a}$$

$$(x_2-x_0)^2+(y_2-y_0)^2+(z_2-z_o)^2=r_{20}^2 \quad \text{eq 2b}$$

$$(x_1-x_2)^2+(y_1-y_2)^2+(z_1-z_2)^2=r_{12}^2 \quad \text{eq 2c}$$

The unknown satellite-to-receiver distances are related to the unknown-receiver positions as follows:

$$(x_{s1}-x_1)^2+(y_{s1}-y_1)^2+(z_{s1}-z_1)^2=R_{s11}^2 \quad \text{eq 3a}$$

$$(x_{s2}-x_1)^2+(y_{s2}-y_1)^2+(z_{s2}-z_1)^2=R_{s21}^2 \quad \text{eq 3b}$$

$$(x_{s3}-x_1)^2+(y_{s3}-y_1)^2+(z_{s3}-z_1)^2=R_{s31}^2 \quad \text{eq 3c}$$

$$(x_{s1}-x_2)^2+(y_{s1}-y_2)^2+(z_{s1}-z_2)^2=R_{s12}^2 \qquad \text{eq 4a}$$

$$(x_{s2}-x_2)^2+(y_{s2}-y_2)^2+(z_{s2}-z_2)^2=R_{s22}^2 \qquad \text{eq 4b}$$

$$(x_{s3}-x_2)^2+(y_{s3}-y_2)^2+(z_{s3}-z_2)^2=R_{s32}^2 \qquad \text{eq 4c}$$

With these 12 equations the set of possible satellite-to-receiver ranges can be computed. Estimating the true satellite-to-receiver ranges is a search for the maximum A over that set.

The location of the unknown-location receivers can be determined based on their relative location with the reference-receiver and their location with respect to the satellite signals. In the case of two unknown-location receivers, the relative positions of the unknown-receivers relative to the reference receiver at $(x_0, y_0, z_0)$, are given by the coordinates:

$$(x_1-x_0, y_1-y_0, z_1-z_0), \text{ and,}$$

$$(x_2-x_0, y_2-y_0, z_2-z_0).$$

The local coordinate system has its origin at $(x_0, y_0, z_0)$ relative to the ECEF coordinate system. The relative distance of any unknown-receiver to the reference receiver is known based on signals between the unknown-receiver to the reference receiver. The search for the unknown-receivers is over a sphere centered on the reference receiver, i.e., centered at $(x_0, y_0, z_0)$. In practice the receiver-to-reference receiver distance is known only to a tolerance, the search area must be expanded to an area between two concentric spheres. The search over the area between two spheres can be no different than a search over the surface of a single sphere. The process is repeated for ever-changing radii of spheres between the inner sphere and the outer sphere. The search process can be performed in parallel using appropriate hardware, thereby reducing the time taken to process the multiple searches.

Figure 10:
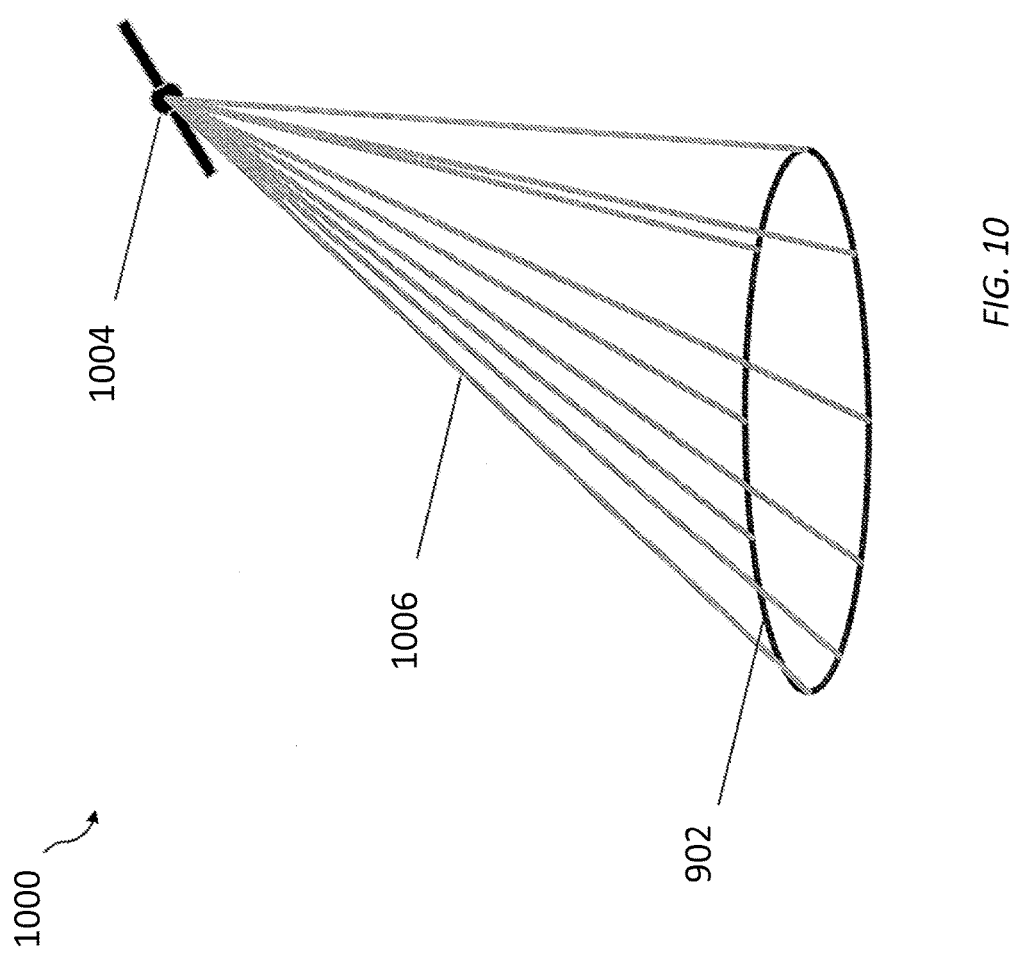
FIG. 10 shows a diagram illustrating possible satellite-to-receiver ranges that satisfy the receiver geometry constraint shown in FIG. 9.

The location of three points relative to each other can provide information as to the difference in altitude between the three points. This yields a search over a flattened surface. In some variations, the selected receivers will be close enough to make the assumption that they all lie on the same plane. A visual example of the receiver location constraint on a plane is shown in FIG. 9, and discussed above. FIG. 10 shows a diagram 1000 illustrating possible satellite to receiver ranges that satisfy the receiver geometry constraint (i.e. that the receiver must lie on one of the circles shown in FIG. 9). FIG. 10 illustrates the example of radius 902 which defines the constraints of the location of the second vehicle 404. Based on this radius 902, the satellite 1004 can thus have a plurality of possible satellite to receiver distances 1006, as shown in FIG. 10. Each of the distances 1006 can be correlated to time delays for the second vehicle 404. In this manner, an additional constraint is obtained on the specific beacon code cross-correlation delays for the first vehicle 402.

Some implementations include a multipath rejection approach including a beam forming analogy, which can separate direct path space from reflection space. For example, with multipath rejection approach, the system and method can include searching only direct paths as possible solutions.

Some implementations include a conceptual approach, which can include knowing GPS satellite positions with the GPS receiver positions unknown. A reference receiver (e.g. the first vehicle 402 in FIG. 8) can be used to determine a position estimate as a basis for defining a local reference plane. The conceptual approach can include a position estimate for the reference receiver. The distances from any other receiver and the reference receiver can be temporarily assumed to be known (e.g. based on GPs measurements of those locations, or other methods) and the receiver to reference receiver distances can constrain the satellite to receiver distances. This can define the satellite to receiver distance solution space or radius of possible positions (as shown in FIG. 9). In other words, a maximum PRN cross correlation can be assumed to occur only at time delays that are consistent with the solution space, which is constrained by knowing that a cone of direct paths including the direct path from the satellite to the first vehicle 402 and a direct path from the satellite to one of the other receivers must be constrained by a circle having a radius equal to the distance between the first vehicle 402 and the other vehicle (e.g. the second vehicle 404, the third vehicle 406, or the fourth vehicle 408 in the illustrated example).

The maximum likelihood satellite-to-receive range estimates can be computed based on the correlated interferers. All correlation values that are not in the direction of the known satellite location relative to a reference receiver can be rejected. The search parameters for the receiver locations are constrained by the receiver-to-receiver equations, above. Unknown-receiver 1 can be given any position on the surface of a sphere defined by the reference receiver to unknown-receiver distance. The allowable values for the position of the unknown-receiver 2 can be computed based on equation 2c, above.

Figure 11:
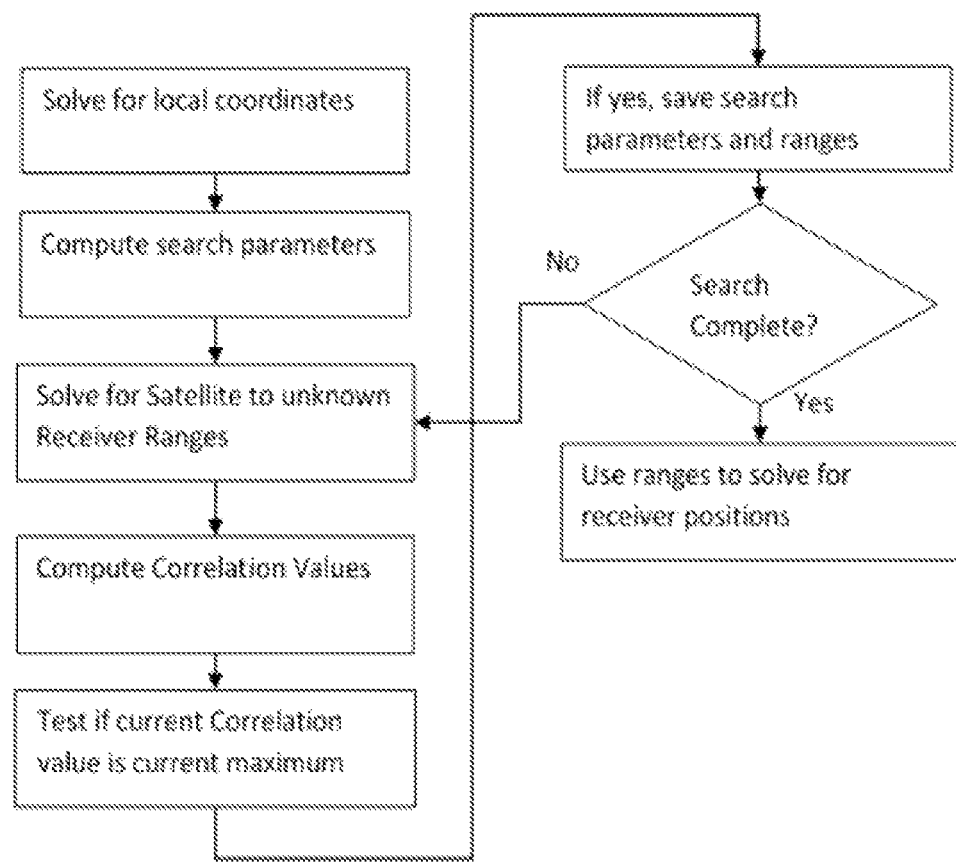
FIG. 11 shows an illustration of the flow of an algorithm for calculating the maximum likelihood of the satellite-to-reference-receiver range, having one or more features consistent with the presently disclosed subject matter.

For the case of three satellites and three receivers, there are six correlation values from equations 3a-c and 4a-c whose sum is the criteria for estimating the ranges. The correlated interferer may satisfy one or two of these equations, but not all six. FIG. 11 is an illustration 1100 of the flow of the algorithm, having one or more features consistent with the presently disclosed subject matter, for calculating the maximum likelihood of the satellite to reference-receiver range.

Searching for the position of receivers can be performed in an angular coordinate system consistent with implementations of the current subject matter. A local coordinate system can be defined to support the solution constraints. This local coordinate system can be defined in a Cartesian coordinate system. However the search over the solution space can be over an angular coordinate system. There can be a need to convert from an angular coordinate system to the local coordinate system to determine the positions of the receivers.

The local coordinate system can be defined as follows. The local x-y plane (reference plane) is defined by the unit normal:

$$\hat{z} = \frac{x_0 i + y_0 j + z_0 k}{\|x_0 i + y_0 j + z_0 k\|_2},$$

which is from the GPS coordinate system origin (ECEF) to the point $(x_0, y_0, z_0)$. The direction of the local x-axis is the projection of the current satellite position vector reference to $(x_0, y_0, z_0)$ onto the plane defined by the unit normal. The satellite position vector is $x_s=(x_s-x_0)i+(y_s-y_0)j+(z_s-z_0)k$ and the projection is $\bar{x}=x_s-(x_s\cdot\hat{z})\hat{z}$, which can be written as:

$$\bar{x}=(x_s-x_0)i+(y_s-y_0)j+(z_s-z_0)k$$

$$-([(x_s-x_0)i+(y_s-y_0)j+(z_s-z_0)k]\cdot\hat{z})\hat{z}$$

The unit vector is written as $$\hat{x} = \frac{\overline{x}}{\|\overline{x}\|_2}.$$

The local y-axis is in the perpendicular direction of $\hat{y}=\hat{x}\times\hat{z}$. The conversion from the angular search value $\Delta\varphi n$ to the x-y coordinates is $\alpha=r_{10}\cos(\Delta\varphi n)$ and $\beta=r_{10}\sin(\Delta\varphi n)$ such that $\alpha\hat{x}+\beta\hat{y}$ is the current unknown-receiver position vector, where, as an example $r_{10}$ is the range from unknown receiver 1 to the reference receiver.

While specific examples are described herein using a Cartesian coordinate system, one of ordinary skill in the art would understand and appreciate that any coordinate system may be used. The mathematical formulae described herein are exemplary only and can be translated for any type of coordinate system.

The search is performed over all possible positions for both unknown-receivers at locations $(x_1, y_1, z_1)$, and $(x_2, y_2, z_2)$. Consequently, there is a requirement to search over two independent angles $\varphi_1$ and $\varphi_2$.

The search parameters for the first unknown-receiver are anywhere on the surface area of a sphere defined by the distance between the reference-receiver to the first unknown-receiver. The search space for the location of first unknown-receiver, as limited to a single plane, is $\alpha_1\hat{x}+\beta_1\hat{y}$ where $\alpha_1=r_{10}\cos(\Delta\varphi_1 n)$ and $\beta_1=r_{10}\sin(\Delta\varphi_1 n)$. The search space for a second unknown-receiver can be defined by the solution for $(x_2, y_2, z_2)$ from equation 2c, above. Since it is assumed, in some circumstances, that both receivers are on the local x-y plane, the solution for $(x_2, y_2, z_2)$ must have the same vector form:

$$(x_2-x_0)i+(y_2-y_0)j+(z_2-z_0)k=\alpha_2\hat{x}+\beta_2\hat{y}$$

The values for $\alpha_2$ and $\beta_2$, above, are the solutions to a quadratic equation. The solution set $\{\alpha_1, \beta_1, \alpha_2, \beta_2\}$ is all the possible locations on the reference plane for the two unknown-receivers. The solution set is mapped back into ECEF coordinates for the next step.

The satellite-to-receiver ranges, for each of the unknown-location receivers, are computed using equations 3a-c and 4a-c, above. The ranges are computed for each search value for the unknown-receiver locations $(x_1, y_1, z_1)$ and $(x_2, y_2, z_2)$. The range equations are used to reject any signal source that is not from the direction of one of the satellites.

Figure 12:
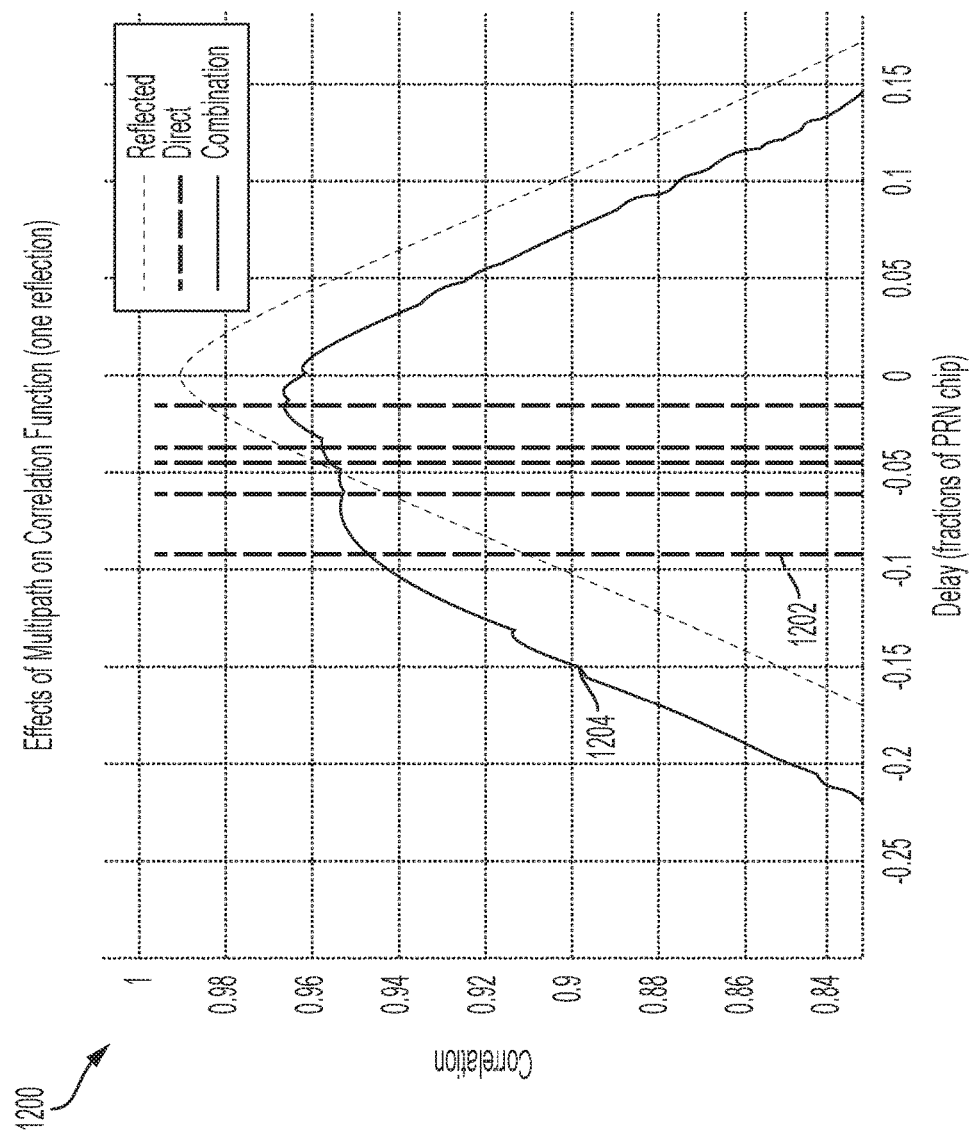
FIG. 12 shows a chart illustrating how the constraints computed for unknown-receiver locations can be used in conjunction with the original cross-correlation function for the first vehicle.

FIG. 12 shows a chart 1200 illustrating how the constraints computed for the unknown-receiver locations can be used in conjunction with the original cross-correlation function for the first vehicle.

In response to determining the satellite-to-receiver ranges, an optimization metric correlation function can be computed. The correlation values are the sum of the satellite signals receiver by the receiver shifted by the current time delay trial computed in the range computations and correlated with the reference PRN sequence. The optimization metric correlation function can be provided by:

$$\Lambda = \sum_{i,k} C_{ik}(-\tau_k(x_k))$$

The notation $C_{ik}(\ )$ is the correlation function between the $i^{th}$ satellite and $k^{th}$ receiver. The computation involves computing the time delays from the search trial range values computed in the previous step:

$$\Lambda = \sum_{i,k} C_{ik}(-R_{ik}^{(n)}/v)$$

where c is the speed of light and i is the satellite index and k is the receiver index. With these time delays, the received signal can be advanced by $s_{ik}(t)$ so that $\overline{s}_{ik}(t)=s_{tk}(t+\tau_{ik})$.

The propagation delay from the satellite to receiver is $t_k(x_k)$ and $x_k$ is the current trial value for the unknown-receiver location. The metric in terms of range is given by:

$$\tau_k(x_k) = \frac{R_{sik}}{c},$$

This function provides an estimate of the range data $R^{(n)}_{ik}$ where n represents the search index for trial position $x_k$, v is the speed of light, i is the satellite index, and k is the receiver index.

Referring again to FIG. 12, the possible maximum value solution for the first vehicle cross-correlation function can be assumed to lie on the intersection of one of the vertical lines 1202 based on the delay observations from the other vehicles. In this manner, the plateau-like combination peak 1204 can be analyzed within a more constrained set of values, and the "peak" corresponding to the direct path "correct" peak in the cross-correlation function can be more readily identified. In this manner, the maximum correlation value over a solution space (i.e., the space defined by a set of specific time delays) can be more accurately determined. For example, the search for maximum correlation value can be only on the observed time delays from the other vehicles 104, 106, 108. The maximum correlation value can be used to determine the actual satellite to receiver distance estimate.

In some variations, atmospheric errors can be considered to cancel when the receivers are within a threshold distance of one another. In some implementations, the threshold distance may be 100 meters. In some implementations, when the receivers have receiver-to-receiver distances in excess of the threshold distance an algorithm can be used to account for errors in the signal caused by the atmosphere. Atmospheric errors can have a correlated portion and an uncorrelated portion. The correlated portion is the same for all receivers that are in the sampling. The uncorrelated portion of atmospheric error increases with the increase of receiver-to-receiver distance.

Figure 13:
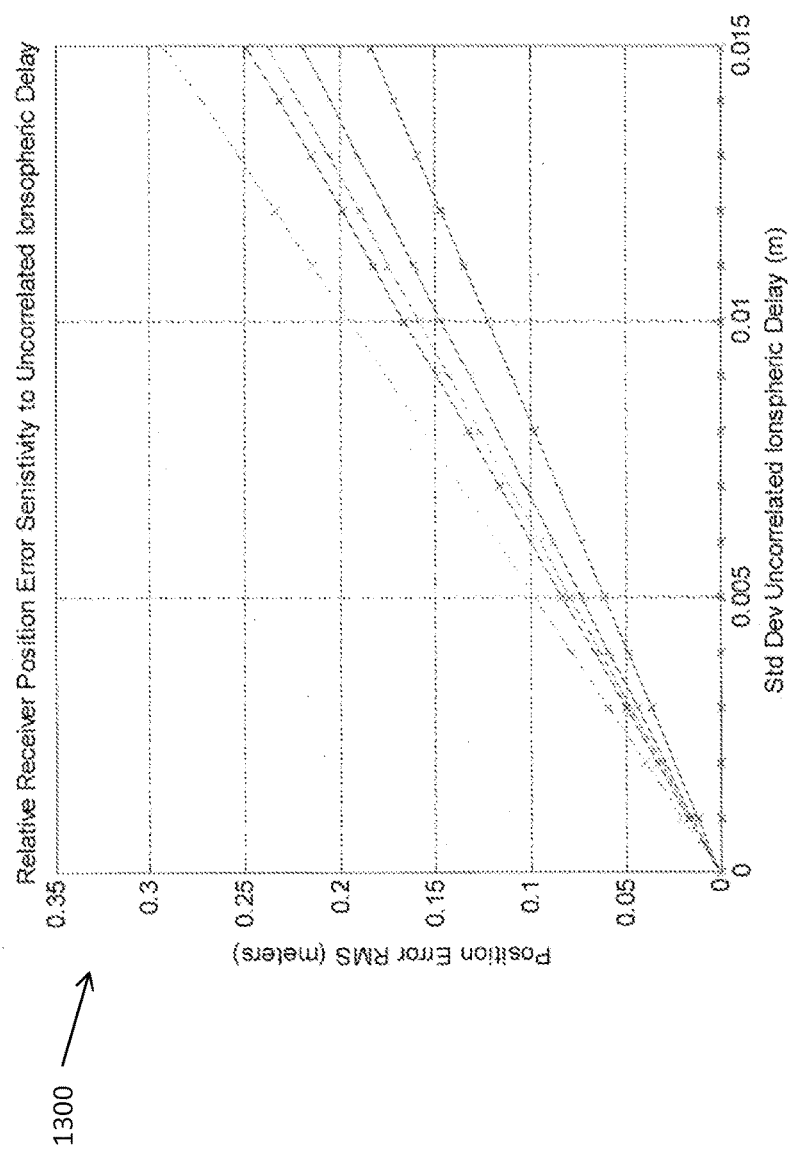
FIG. 13 shows a chart illustrating relative receiver position error sensitivity to uncorrelated ionospheric delay; and, FIG. 14 shows a bar chart illustrating a histogram of range error for the worst of several receivers.

FIG. 13 shows a chart 1300 illustrating relative receiver position error sensitivity to uncorrelated ionospheric delay. The relative positioning graph 1300 can take into consideration that atmospheric errors from one satellite is not the same for every receiver. As such, a one centimeter atmospheric error can translate into a 20 centimeter error for receiver position calculations. The 1300 shows the error performance for, for example, five receivers. Each of the lines plotted in graph 1300 represents a single receiver. Each point of the relative positioning graph 1300 includes 200 Monte Carlo trials. The atmospheric errors can be modeled as Gaussian distributed with the 1-sigma value on the x-axis.

Figure 14:
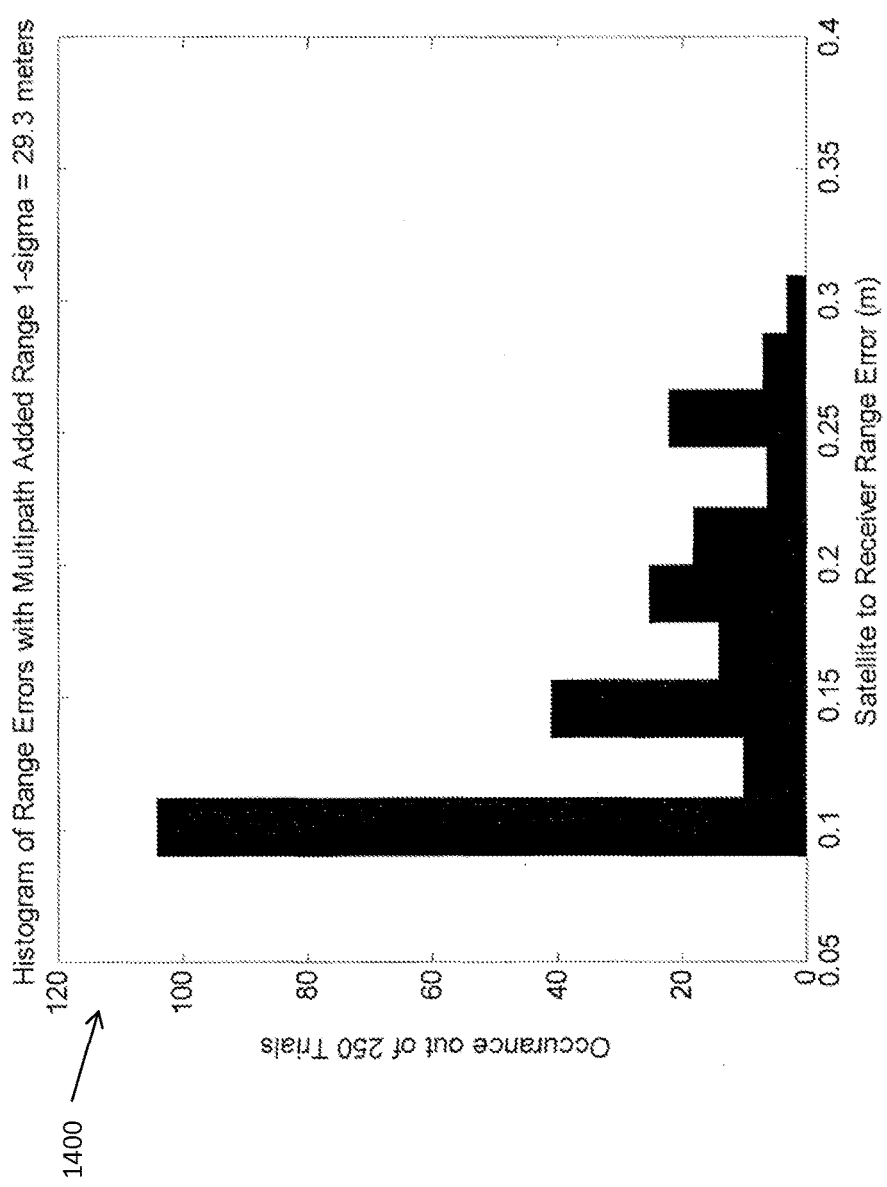

FIG. 14 shows a bar chart 1400 illustrating a histogram of range error for the worst of several receivers used in a test of the current subject matter. In this test, the search grid was set to about ~0.1 m. Consequently, causing a minimum accuracy of about 0.1 m. An ideal result would have all 250 trails in a single bar centered on zero. As shown in FIG. 14, even when the "wrong" range is chosen the error is less than or equal to 0.3 m for applications of the current subject matter.

One or more algorithms can be used to assist with improving the accuracy of GPS tracking. For example, a first algorithm can reduce atmospheric errors using simultaneous position estimation of a number of receivers given shared data. In addition, a second algorithm can reduce multipath errors using a geometrically constrained search.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor of a reference-receiver that includes a beacon-signal receiver and a transceiver, cause the at least one programmable processor to perform operations comprising:

receiving, at the transceiver of the reference-receiver, receiver-distance information from one or more unknown-location receivers using at least one inter-receiver communication link, the receiver-distance information including an indication of the distance between the reference-receiver and the one or more unknown-location receivers, and distances between the unknown-location receivers determined using at least one inter-receiver communication link, wherein the unknown-location receivers and the reference-receiver form an ad hoc antenna system;

receiving at the transceiver of the reference-receiver, beacon-distance information from the one or more unknown-location receivers, the beacon-distance information including an indication of the distance between one or more beacons and the one or more unknown-location-receivers;

receiving, at the beacon-signal receiver the reference-receiver, one or more signals from the one or more beacons;

determining, using the at least one programmable processor, based on one or more positions of the one or more beacons, one or more expected delays of a receipt of one or more beacon-to-receiver signals at each receiver, including each unknown-location receiver and the reference-receiver;

generating, using the at least one programmable processor, based on the one or more determined expected delays, a correlation function representative of cross-correlations between known beacon-to-receiver distances and received beacon-to-receiver distances;

identifying, using the at least one programmable processor, based on the generating, a maximum value of the correlation function; and searching, using the at least one programmable processor, locations of the unknown-location receivers and selecting locations for the one or more unknown-location receivers based on the identified maximum value of the correlation function; and determining, using the at least one programmable processor of the reference-receiver, based on the selecting, the locations of the one or more unknown-location receivers relative to the reference-receiver based on the received receiver-distance information from the one or more unknown-location receivers, and the received beacon-distance information from the one or more unknown-location receivers.

2. The computer program product as in claim 1, wherein the operations further comprise:

computing a local-coordinate system for the reference-receiver and the one or more unknown-location-receivers centered on the reference-receiver.

3. The computer program product as in claim 2, wherein the operations further comprise:

defining a sphere having a surface area on which individual ones of the one or more unknown-location receivers are positioned, the radius of the sphere based on the receiver-distance information received by the reference-receiver from individual ones of the one or more unknown-location receivers and the center of the sphere based on the local-coordinate system.

4. The computer program product as in claim 3, wherein the operations further comprise:

determining a plane on which the reference-receiver and at least some of the one or more unknown-location receivers reside to provide the radius of a circle on which the one or more unknown-location receivers are positioned relative to the reference-receiver.

5. The computer program product as in claim 4, wherein the operations further comprise:

determining a range of beacon-to-unknown-location-receiver distances based on the beacon-distance information received from the unknown-location receivers and constrained by the circle.

6. The computer program product method as in claim 1, wherein the operations further comprise:

computing, at the one or more unknown-location-receivers, the one or more correlation coefficients based on the ranges of beacon-to-unknown-location-receiver distances for the one or more unknown-location receivers; and, receiving, at the reference-receiver, the one or more correlation coefficients from the one or more unknown-location-receivers.

7. The computer program product as in claim 5, wherein the operations further comprise:

computing, at the one or more unknown-location-receivers, the one or more correlation coefficients based on the ranges of beacon-to-unknown-location-receiver distances for the one or more unknown-location receivers; and, receiving, at the reference-receiver, the one or more correlation coefficients from the one or more unknown-location-receivers.

8. The computer program product as in claim 7, wherein the operations further comprise:

filtering, at the reference-receiver, the one or more correlation coefficients based on constraints provided by the determined radii of the circles on which the one or more unknown-location-receivers are located to provide filtered correlation coefficients; and, computing, at the reference-receiver, the likely locations of the one or more unknown-location-receivers relative to the reference-receiver based on the filtered correlation coefficients.

9. The computer program product as in claim 8, wherein computing the likely location of the one or more unknown-location receivers relative to the reference-receiver includes applying each of the filtered correlation coefficients to a location algorithm to converge to a solution.

10. The computer program product as in claim 1, wherein the receiver-distance information is based on one or more wireless communications between the reference-receiver and the one or more unknown-location receivers.

11. The computer program product of claim 1, wherein the received beacon-distance information from the one or more unknown-location receivers comprises one or more correlation coefficients for individual ones of the one or more beacons based on the one or more signals received at the unknown-location-receivers from the one or more beacons, each beacon emitting a signal containing a code specific to that beacon.

12. The computer program product as in claim 1, wherein the operations further comprise:

receiving geographic location information at one of the reference-receiver or the one or more unknown-location-receivers; and, determining the geographic location of the reference-receiver and/or the one or more unknown-location-receivers based on the received geographic location information and the relative location of the reference-receiver to the one or more unknown-location receivers.

13. The computer program product as in claim 1, wherein the reference-receiver is a GPS receiver.

14. A method for determining the positions of one or more unknown-location-receivers at a reference-receiver that includes a beacon-signal receiver and a transceiver and configured to receive signals from one or more beacons, the method implemented by at least one programmable processor forming at least one computing device, the method comprising:

receiving, at the transceiver of the reference-receiver, receiver-distance information from one or more unknown-location receivers using at least one inter-receiver communication link, the receiver-distance information including an indication of the distance between the reference-receiver and the one or more unknown-location receivers, and distances between the unknown-location receivers determined using at least one inter-receiver communication link, wherein the unknown-location receivers and the reference-receiver form an ad hoc antenna system;

receiving, at the transceiver of the reference-receiver, beacon-distance information from the one or more unknown-location receivers, the beacon-distance information including an indication of the distance between one or more beacons and the one or more unknown-location-receivers;

receiving, at the beacon-signal receiver of the reference-receiver, one or more signals from the one or more beacons;

determining, by at least one programmable processor, based on one or more positions of the one or more beacons, one or more expected delays of a receipt of one or more beacon-to-receiver signals at each receiver, including each unknown-location receiver and the reference-receiver;

generating, by at least one programmable processor, based on the one or more determined expected delays, a correlation function representative of cross-correlations between known beacon-to-receiver distances and received beacon-to-receiver distances;

identifying, by at least one programmable processor, based on the generating, a maximum value of the correlation function;

searching, by at least one programmable processor, locations of the unknown-location receivers and selecting locations for the one or more unknown-location receivers based on the identified maximum value of the correlation function; and determining, by at least one programmable processor, based on the selecting, the locations of the one or more unknown-location receivers relative to the reference-receiver based on the received receiver-distance information from the one or more unknown-location receivers, and the received beacon-distance information from the one or more unknown-location receivers.

15. The method as in claim 14, further comprising:
computing a local-coordinate system for the reference-receiver and the one or more unknown-location-receivers centered on the reference-receiver;

defining a sphere having a surface area on which individual ones of the one or more unknown-location receivers are positioned, the radius of the sphere based on the receiver-distance information received by the reference-receiver from individual ones of the one or more unknown-location receivers and the center of the sphere based on the local-coordinate system;

determining a plane on which the reference-receiver and at least some of the one or more unknown-location receivers reside to provide the radius of a circle on which the one or more unknown-location receivers are positioned relative to the reference-receiver; and, determining a range of beacon-to-unknown-location-receiver distances based on the beacon-distance information received from the unknown-location receivers and constrained by the circle.

16. The method as in claim 14, further comprising:
computing, at the one or more unknown-location-receivers, the one or more correlation coefficients based on the ranges of beacon-to-unknown-location-receiver distances for the one or more unknown-location receivers; and, receiving, at the reference-receiver, the one or more correlation coefficients from the one or more unknown-location-receivers.

17. The method as in claim 16, further comprising:
filtering, at the reference-receiver, the one or more correlation coefficients based on constraints provided by the determined radii of the circles on which the one or more unknown-location-receivers are located to provide filtered correlation coefficients;

computing, at the reference-receiver, the likely locations of the one or more unknown-location-receivers relative to the reference-receiver based on the filtered correlation coefficients.

18. A system comprising:
a beacon-signal receiver configured to receive and decode signals received from one or more beacons having a known location, the signals from the one or more beacons comprising beacon-identifying information and a time at which the signals were emitted;

a transceiver configured to transmit and/or receive signals from one or more unknown-location receivers, the signals from the one or more unknown location receivers including:

beacon-distance information, the beacon-distance information including an indication of the distance between one or more beacons;

distances between the unknown-location receivers, the information determined using at least one inter-receiver communication link; and, receiver-distance information, the receiver-distance information including an indication of the distance between a reference-receiver and the one or more unknown-location receivers received using at least one inter-receiver communication link, wherein the unknown-location receivers and the reference-receiver form an ad hoc antenna system; and, at least one programmable processor of the reference-receiver, configured to perform the following operations:

determine, based on one or more positions of the one or more beacons, one or more expected delays of a receipt of one or more beacon-to-receiver signals at each receiver, including each unknown-location receiver and the reference-receiver;

generate, based on the one or more determined expected delays, a correlation function representative of cross-correlations between known beacon-to-receiver distances and received beacon-to-receiver distances;

identify, based on the generating, a maximum value of the correlation function;

search locations of the unknown-location receivers and select locations for the one or more unknown-location receivers based on the identified maximum value of the correlation function; and determine, based on the selecting, the locations of the one or more unknown-location receivers relative to the reference-receiver based on the received receiver-distance information from the one or more unknown-location receivers, and the received beacon-distance information from the one or more unknown-location receivers.

19. The system as in claim 18, wherein:
the one or more unknown-location receivers are configured to compute the one or more correlation coefficients based on the ranges of beacon-to-unknown-location-receiver distances for the one or more unknown-location receivers;

the transceiver is configured to receive the one or more correlation coefficients from the one or more unknown-location-receivers; and, the at least one programmable processor is configured to:

filter the one or more correlation coefficients based on constraints provided by the determined radii of the circles on which the one or more unknown-location-receivers are located to provide filtered correlation coefficients; and, compute the likely locations of the one or more unknown-location-receivers relative to the reference-receiver based on the filtered correlation coefficients.

\* \* \* \* \*